Nov. 1, 1960  T. O. FIELD  2,958,805
GAP-TYPE LIGHTNING ARRESTERS
Filed Dec. 4, 1959
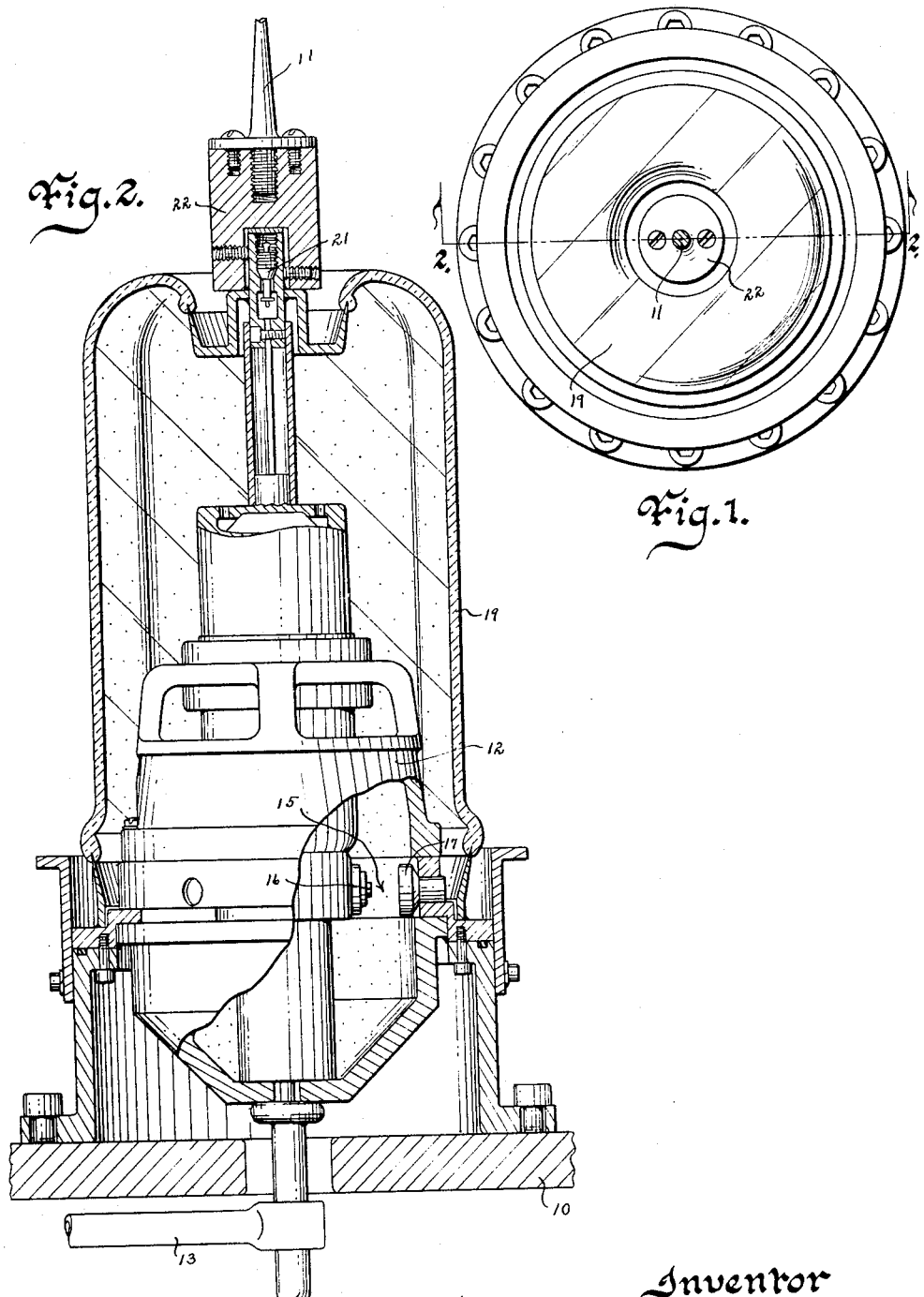
Witness
Edward P. Seeley
Inventor
Thomas O. Field
by M. Talbert Dick
Attorney

2,958,805
GAP-TYPE LIGHTNING ARRESTERS

Thomas O. Field, Columbus, Nebr., assignor to Dale Products, Incorporated, Columbus, Nebr.

Filed Dec. 4, 1959, Ser. No. 857,316

3 Claims. (Cl. 315—59)

This invention relates to a method of increasing the efficiency of gap-type lightning arresters and more particularly to lightning arresters used in aircraft which are required to successfully withstand a plurality of lightning strokes before replacement.

It is not uncommon for lightning to strike aircraft in flight. Usually neither the aircraft per se nor the personnel is seriously harmed. However, it is quite common for expensive electronic equipment, such as radio, radar, electrical controls, and like, to be badly damaged by lightning. Not only are such losses costly, but the aircraft is deprived of their usage until they are repaired or replaced.

Some effort has been made to provide an aircraft lightning arrester which will withstand at least more than one lightning stroke, such as the device disclosed in the patent of Herman R. Person on a Lightning Arrester, Patent No. 2,916,667, under issue date of December 8, 1959. However, in such lightning arresters the electrodes rapidly disintegrate from lightning strokes. Also the atmosphere within the unit does not properly transfer thermal heat from the electrodes to the walls of the arrester.

Therefore one of the principal objects of my invention is to provide a method of proper electrode burning without causing the disintegration of the electrodes into chunks of material.

A further object of this invention is to provide a proper thermal transfer of heat from the electrode to the walls of the arrester before electrode damage can result.

A still further object of this invention is to provide a chemical gas within a gap-type lightning arrester that not only accomplishes the above objects, but provides the proper dielectric strength to cause RF breakdown to be at a specified value determined by individual customer requirements.

These and other objects will be apparent to those skilled in the art.

My invention consists in the construction, arrangements, and combination, of the various parts of the device, and the method of using same, whereby the objects contemplated are attained as hereinafter more fully set forth, specifically pointed out in my claims, and illustrated in the accompanying drawings, in which:

Fig. 1 is a top plan view of one specific type of lightning arrester that I increase the efficiency thereof by subjecting its interior to a chemical gas, and Fig. 2 is a longitudinal sectional view of the lightning arrester taken on line 2—2 of Fig. 1 and more fully illustrates its construction.

The specific structure of the lightning arrester is not important provided it is of the sealed gap-type as shown in these drawings or as disclosed in the herebefore mentioned Patent No. 2,916,667. Such arresters are secured to an aircraft or like 10, and have or are connected to an antenna 11. Normally the electrical impulses will flow from the antenna, thence through the core 12, and to the lead 13 which extends to the instruments of the aircraft. However, in case of a lightning stroke the core cannot carry such an electric load and the same breaks across the gap 15 between each pair of the two electrodes 16 and 17. The electrodes are housed and sealed and usually at least a portion of the housing consists of a glass jar member 19 as shown in Fig. 2. It is inside this sealed housing and therefore between the two electrodes of each pair that I maintain a chemical gas to increase the efficiency of the unit. This gas may be inserted into the housing by any suitable means. In the drawings I show a valve and valve core means 21 which is exposed upon the removal of the antenna shaft base 22. The gases I inject into this sealed housing are oxygen, krypton and sulfurhexafluoride. Oxygen is utilized to provide proper electrode burning without causing disintegration of the electrodes into chunks of material. Krypton is utilized to provide proper thermal transfer of heat from the electrode to the walls of the arrester before electrode damage can result. Sulfurhexafluoride is utilized to provide the proper dielectric strength to the gas mixture to cause RF breakdown to be at a specified value determined by individual customer requirements.

The relative percentages of gases used may vary somewhat, but I recommend the following:

49.4 cm. of oxygen (9.56 p.s.i.a.) @ 25° C
49.4 cm. of krypton (9.56 p.s.i.a.) @ 25° C
12.0 cm. of sulfurhexafluoride (2.32 p.s.i.a.) @ 25° C.

With such a gas mixture within the arrester and between the electrodes the electrodes will not tend to disintegrate from lightning strokes and thermal heat will be transferred from the electrodes to the walls of the arrester before the electrodes are damaged. Also the gas mixture provides the proper dielectric strength to cause desired RF breakdown at a specified value to meet specific requirements. This latter is accomplished by a knowledge of the action of the gas mixture plus the space gap between the electrodes.

It should be realized that the three composition gases, oxygen, krypton and sulfurhexafluoride, do not combine chemically to provide the lightning arrester protection. During the course of stroking a lightning arrester with this gas mixture, a portion of the oxygen is used up in combustion of the electrode material, a portion of the sulfurhexafluoride is chemically changed into fluorine gas and sulphur products. The krypton remains essentially in percentage as was originally placed in the unit.

As the gas mixture changes percentagewise during stroking, mechanical configuration of the electrodes is also changing. The net result is to provide essentially constant breakdown characteristics of the electrodes through a stroking sequence of up to many strokes.

From the foregoing it will be seen that I have made possible the successful continued use of sealed gap-type lightning arresters although subjected to many lightning strokes.

Some changes may be made in my method of increasing the efficiency of gap-type lightning arresters without departing from the real spirit and purpose of my invention, and it is my intention to cover by my claims, any modified methods or use of equivalents which may be reasonably included within their scope.

I claim:

1. A lightning arrester having a sealed housing and a spark gap inside said housing, said housing containing a gas comprising oxygen, krypton and sulfurhexafluoride.

2. A lightning arrester having a sealed housing, a spark gap inside said housing, said housing containing a gas comprising substantially equal parts of oxygen and krypton, and also containing sulfurhexafluoride in less amount than either said oxygen or krypton.

3. A lightning arrester having a sealed housing, a spark gap inside said housing, said housing containing a gas consisting essentially of oxygen, krypton and sulfurhexafluoride in the ratio of 49.4 cm. krypton, 49.4 cm. oxygen and 12.0 cm. of sulfurhexafluoride.

References Cited in the file of this patent

UNITED STATES PATENTS

| | | |
|---|---|---|
| 2,906,925 | Yonkers et al. | Sept. 29, 1959 |
| 2,916,667 | Person | Dec. 8, 1959 |